Dec. 30, 1930.  J. A. MAHR  1,786,764
WHEEL AND WHEEL JOURNAL
Filed Nov. 6, 1929
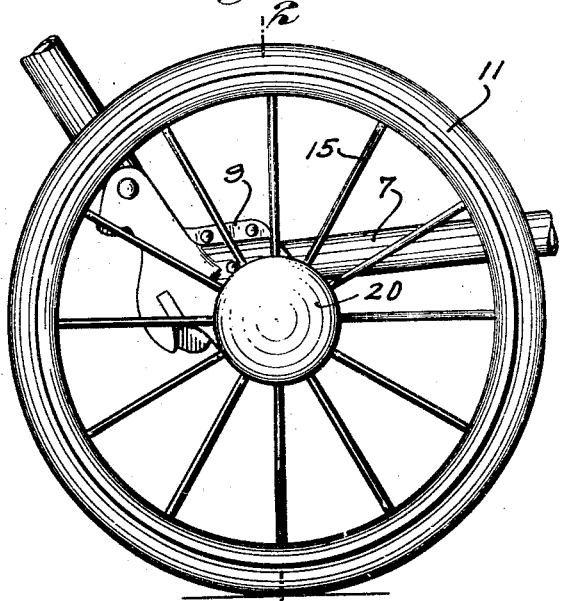
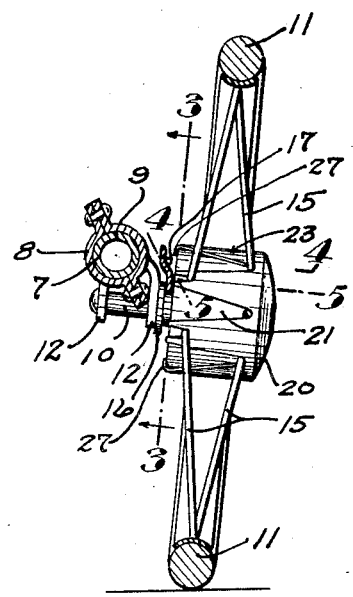
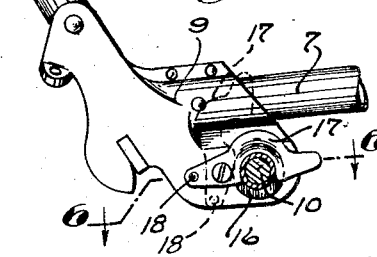
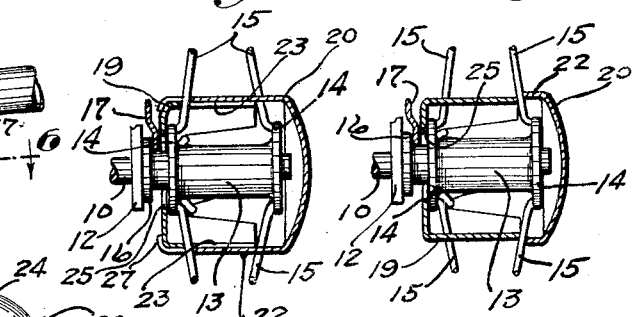
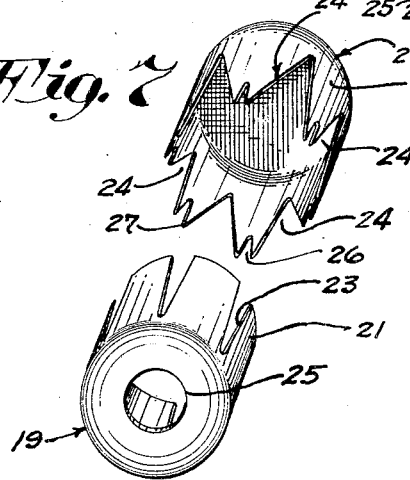
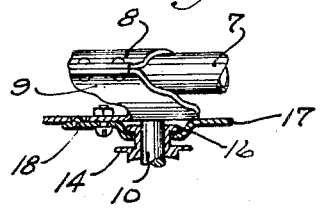
Inventor
Julius A. Mahr
By his Attorneys Patented Dec. 30, 1930

1,786,764

UNITED STATES PATENT OFFICE

JULIUS A. MAHR, OF MINNEAPOLIS, MINNESOTA

WHEEL AND WHEEL JOURNAL

Application filed November 6, 1929. Serial No. 405,113.

My present invention relates to wheels and wheel journals and has for its object to improve same as will hereafter appear. Said invention while intended for general use is especially well adapted for use in connection with a folding baby carriage disclosed and broadly claimed in my copending application filed December 12, 1928 under Serial No. 325,411.

To the above end, generally stated, the invention consists of the novel devices and combination of devices hereinafter described and defined in the claims.

In the accompanying drawings, which illustrate the invention, like characters indicate like parts throughout the several views Referring to the drawings:

Fig. 1 is an outside elevation of a wire wheel and wheel journal having the invention embodied therein;

Fig. 2 is a view partly in front elevation and partly in transverse vertical section taken on the line 2—2 of Fig. 1;

Fig. 3 is a fragmentary detail view principally in outside elevation with some parts sectioned on the line 3—3 of Fig. 2;

Fig. 4 is a fragmentary view partly in elevation and partly in section taken on the line 4—4 of Fig. 2, on an enlarged scale;

Fig. 5 is a fragmentary view partly in elevation and partly in section taken on the line 5—5 of Fig. 2, on an enlarged scale;

Fig. 6 is a fragmentary detail view with some parts sectioned on the irregular line 6—6 of Fig. 3; and Fig. 7 is a perspective view of the box removed from the wheel with the members thereof separated.

The numeral 7 indicates one of the longitudinal side bars of the chassis of the folding baby carriage heretofore identified and has on each end a coupling, only one of which is shown, comprising inner and outer pressed metal plates 8 and 9, respectively, which are rigidly connected by rivets to each other and to said side bar.

To the coupling 8—9 is rigidly secured a spindle 10 on which is removably journaled a wire wheel 11. This spindle 10 projects outwardly of the side bar 7 and its inner end portion is mounted in aligned bores in a pair of depending laterally spaced inner and outer lugs 12 integrally formed with the coupling members 8—9. The spindle 10 where it passes through the inner lug 12 is circumferentially reduced to form shoulder that engages the outer face of the inner lug 12 and its inner end is upset against the inner face of said lug to rigidly secure the spindle 10 to the coupling 8—9.

The hub 13 of the wheel 11, as shown, is in the form of a tube having axially spaced inner and outer annular flanges 14 to which the inner ends of the spokes 15 of the wheel 11 are alternately secured. The spokes 15 are in outwardly converging relation both in the plane of the wheel 11 and transversely thereof. On the extreme inner end of the hub 13 is an annular flange 16 axially spaced from the inner flange 14.

A hook-like latch 17 is provided for releasably holding the wheel 11 on the spindle 10 and which latch is pivoted to the coupling member 9 for swinging movement transversely of said spindle, extends in the channel formed by the inner flange 14 and the flange 16 and holds the hub 13 against axial removal from the spindle 10.

To hold the latch 17 in an operative position, a friction stop, in the form of a bead 18, on a short extension of said latch, is arranged to enter a seat in the form of a hole in the coupling member 9 and yieldingly hold said latch in an operative position. On the forward end of the latch 17 is an extension, which affords a hand piece by which said latch may be manipulated. The coupling member 9, above the spindle 10, is inwardly and upwardly inclined and affords a cam surface with which the free end portion of the latch 17 engages during its closing movement and thereby springs said latch laterally outward and places the same under tension to hold the friction bead 18 in its seat.

In place of applying the customary hub cap to the wheel 11 the entire hub 13 and spindle 10 within said hub are encased by a two-part metallic box comprising an inner and outer cap 19 and 20, respectively, having capping flanges 21 and 22, respectively.

These capping flanges 21 and 22 are detachably connected by telescoping the latter on the former and encircle the hub 13 between the spokes 15 as well as the ends thereof. The flanges 21 and 22 are provided with deep circumferentially spaced V-shaped notches 23 and 24, respectively, through the former of which the inner spokes 15 extend and through the latter of which the outer spokes 15 extend. An axial passageway 25 is formed in the cap 19 for the spindle 10. It will be noted that the inner and outer spokes 15 are not opposite each other so that they extend through alternate notches 23 and 24 in the capping flanges 21 and 22 and that the V-shaped intervening body portions of said flanges, at their longitudinal edge portions overlap each other, and thereby, together with the caps 19 and 20, form a box-like structure that is closed except where the spindle 10 and spokes 15 pass therethrough.

To lock the two caps 19 and 20 together in assembled relation the apexes of the V-shaped body portions of the capping flange 22 are bifurcated at 26 to receive the inner spokes 15 and their prongs are bent laterally inward to form lock lugs 27 which engage the cap 19. In case it is necessary to remove the caps 19 and 20 from the wheel 11, the V-shaped body portions of the capping flanges 21 and 22 may be sprung laterally outward to release the lock lugs 27 from the cap 19. This box or casing not only encases the hub 13, but also closes the ends thereof to protect the same from dust and dirt and the escape of grease. Said casing also gives the wheel 11 a massive and ornamental appearance which, at present, is the trend of automobile construction.

What I claim is:

1. A box for encasing the hub of a wheel having wire spokes and comprising inner and outer caps provided with capping flanges telescoped the one on the other said inner cap having a spindle passageway.

2. The structure defined in claim 1 in which the capping flanges have deep notches for the spokes of the wheel and wherein each capping flange covers the notches in the other capping flange.

3. The structure defined in claim 1 in which the capping flanges have deep notches for the spokes of the wheel and wherein each capping flange covers the notches in the other capping flange, and means for holding the caps assembled.

4. A box for encasing the hub of a wheel having inner and outer wire spokes alternately arranged and comprising inner and outer caps provided with capping flanges telescoped the one on the other, said inner cap having a spindle passageway and deep notches for the inner spokes, said outer capping flange having deep notches for the outer spokes, each capping flange being arranged to cover the notches in the other capping flange, and means for holding the caps assembled.

5. A box for encasing the hub of a wheel, having inner and outer wire spokes alternately arranged, comprising inner and outer caps provided with capping flanges telescoped the former on the latter, said capping flanges having deep notches for the spokes and intervening body portions which cover said notches except where spokes pass therethrough, the body portions of the outer capping flange being bent laterally inward to form lock lugs which engage the inner cap and hold the two caps assembled.

6. A box for encasing the hub of a wheel, having inner and outer wire spokes alternately arranged, comprising inner and outer caps provided with capping flanges telescoped the former on the latter, said inner cap having a spindle passageway, said capping flanges having deep V-shaped notches for the spokes and intervening V-shaped body portions covering said notches, the apexes of said V-shaped body portions of the outer capping flange being bifurcated to receive the inner spokes, and the prongs thereof being bent laterally inward to form lock lugs which engage the inner cap and hold the caps assembled.

In testimony whereof, I affix my signature.

JULIUS A. MAHR.